United States Patent Office 2,863,798
Patented Dec. 9, 1958

2,863,798

IODINE CHLORIDE PREPARATION FOR CONTROLLING MICROORGANISMS

Morris V. Shelanski, Atlantic City, N. J., and Murray W. Winicov, Philadelphia, Pa., assignors to West Laboratories, Inc., Long Island City, N. Y., a corporation of New York No Drawing. Application November 5, 1956
Serial No. 620,169

7 Claims. (Cl. 167—17)

This invention relates to preparations for controlling microorganisms, particularly bacteria, fungi and molds. More particularly the invention relates to improved iodine compositions wherein iodine chloride is complexed with certain surface active agents. The present application is a continuation-in-part of our pending application Serial No. 283,981, filed April 23, 1952, now abandoned.

Iodine is recognized as an excellent bactericide. However, it cannot be efficiently used in its free form because of its high vapor pressure resulting in excessive loss of the free iodine when applied to control microorganisms. In view of its poor solubility in water (only 0.0162 part of iodine dissolve in 100 parts of water at 0° C. and 0.09566 part of iodine dissolve in 100 parts of water at 60° C.), it cannot be used in the form of an aqueous solution. A solution of iodine in the common water miscible solvents for iodine such as acetone, ethyl alcohol, methyl alcohol, glycols and glycerols, cannot be used effectively to control microorganisms because in water much of the iodine will be precipitated promptly and is lost in aqueous dilution of the solution without exercising its germicidal action. The addition of an iodine solution in a water immiscible solvent such as carbon tetrachloride, benzene and ether to water containing microorganisms does not result in control of the microorganisms because little of the iodine dissolves in the water, the amount thus dissolved being limited by the solubility of iodine in water which as above noted is very small.

It has been proposed to produce iodine complexes, i. e. to incorporate iodine in a surface active agent or detergent, referred to herein as an iodine carrier, which complexes when added to aqueous media gradually release the iodine as free iodine so that it is germicidally effective.

This invention is in the nature of an improvement on such complexes.

It is an object of this invention to provide an iodine containing preparation which is effective to control microorganisms; in which preparation all of the iodine is effective as contrasted with prior known complexes in which only approximately ⅔ of the iodine is effective, which can be produced more economically than prior known complexes and in the use of which iodine which had formed organic iodides with microorganisms and thus destroyed the microorganisms is regenerated as free iodine which again becomes effective to destroy more microorganisms.

Other objects and advantages of this invention will be apparent from the following detailed description thereof.

In accordance with this invention an aliphatic fatty acid, alkylene oxide condensate or an alkyl aryl sulfonate (which for convenience will be hereinafter referred to as condensate and sulfonate, respectively, or collectively as "the carriers"), is combined with iodine chloride forming a liquid or solid preparation depending upon whether the condensate or sulfonate is liquid or solid.

As the iodine chloride employed, iodine monochloride is preferred, although as much chlorine may be combined with the iodine in the presence of the condensate or sulfonate as corresponds with the formation of iodine pentachloride or any desired lower ratio of chlorine to iodine than the 5 to 1 ratio in iodine pentachloride. The preparation may contain from 0.1% to 30% iodine, preferably from 5 to 15%, by weight of iodine based on the weight of the condensate or sulfonate, and from 0.1% to 10%, preferably from 2% to 8% chlorine, based on the weight of the condensate or sulfonate.

The resulting carrier-iodine chloride can be utilized directly in preparing use dilutions in aqueous media containing iodine concentrations suitable for controlling microorganisms, i. e. from about 5 to 10 p. p. m. up to several hundred p. p. m. depending upon the intended use and quantity of microorganisms to be destroyed. Alternatively, the preparations may be partially diluted or extended with water or other solvent media, or with a water soluble solid extender which is inert to iodine, such as urea, to provide practical concentrates for distribution, which are in turn diluted to provide the final aqueous use solutions. Such concentrates can suitably contain from about 0.1% to 50% or more of the carrier-iodine chloride preparation having regard for convenience in packaging and intended dilution by the user in preparing use solutions.

When use solutions are applied to control microorganisms they release the iodine chloride gradually forming free iodine upon decomposition of the iodine chloride, which decomposition takes place readily as the iodine chloride is released. The solution is therefore most effective for controlling microorganisms.

The preparations of this invention have a number of surprising advantages over prior known iodine complexes and iodine containing compositions. Among the more important of these advantages are the following:

(1) In the case of iodine complexes heretofore known the iodine reacts with constituents which may be present, for example, the carrier for the iodine or other constituents in the aqueous medium to which the complex is added with formation of iodides which are ineffective to control microorganisms. As much as about one-third of the iodine may thus be lost insofar as any effective germicidal action is concerned. When employing iodine chloride preparations of this invention surprisingly such reaction, if it takes place, is substantially offset by an iodine regenerative action rendering the iodine again effective to control microorganisms.

(2) There is a synergistic action between the iodine chloride and the carrier which action improves the activity of the iodine from the standpoint of its ability to control microorganisms.

(3) Iodine chloride alone is dangerous in view of its toxity. Also iodine chloride alone has a high vapor pressure causing a loss of the iodine chloride from the solvent in which it may be dissolved. Furthermore, iodine chloride is very reactive so that when applied it rapidly loses its bactericidal effectiveness due to reaction with other materials which may be present, rather than exercising its germicidal properties on microorganisms to effect their control. In combination with the condensate or sulfonate a stabilized preparation results which, when added to water, forms a solution of any desired concentration, and which solution gradually exerts its effectiveness in the control of microorganisms.

As preferred carriers of the condensate type we employ condensates of aliphatic fatty acids having 6 to 26 carbon atoms, preferably 12 to 18 carbon atoms, with alkylene oxide in which from 4 to 60, preferably 5 to 30, mols of alkylene oxide are condensed per mol of aliphatic fatty acid. The preferred alkylene oxides are ethylene oxide and propylene oxide.

The preferred carriers of the sulfonate type are alkyl aryl sulfonate in which the alkyl group contains from 1 to 30, preferably 4 to 20, carbon atoms, and the aryl group is phenyl or naphthyl. Alkyl aryl sodium sulfonate, potassium sufonate, ammonium sulfonate, or sulfonic acid may be used. The expression "alkyl aryl sulfonates" is intended to include both the free acid and the ammonium or alkali metal salts.

The iodine chloride-carrier complexes can be prepared directly by complexing iodine chloride with the carrier or indirectly by first complexing iodine with the carrier and forming the iodine chloride in situ by passing chlorine gas into a liquefied carrier-iodine complex. When the carrier is a liquid or a semi-solid which can be liquefied by heating, iodine or iodine chloride can be added to the carrier for complexing and mixed therewith at room temperature, or at the necessary elevated temperature until the iodine or iodine chloride is completely dissolved. In instances where the carrier is a solid which does not melt at reasonable temperatures, such carrier can be dissolved in water to form a concentrated aqueous solution and the iodine chloride or iodine and then the chlorine added to the aqueous solution to effect complexing.

The procedure of forming iodine chloride in situ as above described is particularly advantageous for a large scale operation since it avoids the need for handling iodine chloride per se and it also facilitates the addition of varying amounts of chlorine so that the resulting product may in fact be a complex of iodine monochloride, trichloride, pentachloride, or mixtures thereof. The following examples will illustrate typical iodine-carrier complexes in accordance with our invention, but it is to be understood that these examples are given by way of illustration and not of limitation. In the examples all parts are intended as parts by weight.

*Example I*

90 parts of a lauric acid ethylene oxide condensate containing 15 mols of ethylene oxide per mol of lauric acid are heated to about 40° C. to liquefy the condensate, 10 parts of free crystalline iodine are added and the mixture stirred for about one hour. 2.8 parts of chlorine gas are then bubbled through the resultant liquid for a period of about a half hour while cooling the mixture. At the end of this time the characteristic brown color of iodine disappears indicating that the chlorine has combined with the iodine to form an iodine chloride.

*Example II*

An iodine chloride-carrier complex is prepared by mixing together at room temperature 12.8 parts of iodine monochloride and 77.2 parts of lauric acid ethylene oxide condensate containing about 10 mols of ethylene oxide per mol of lauric acid.

*Example III*

An iodine chloride-carrier complex is prepared by first dissolving 98.5 parts of sodium mixed butyl naphthyl sulfonate in sufficient water to form a concentrated solution and mixing into such concentrated solution 1.5 parts of iodine trichloride.

*Example IV*

An iodine chloride-carrier complex is prepared by melting 84 parts of an ethylene oxide stearic acid condensate containing 20 mols of ethylene oxide per mol of stearic acid and dissolving therein 10 parts of iodine monochloride.

*Example V*

An iodine chloride-carrier complex is prepared by mixing together 5 parts of iodine monochloride and 95 parts of dodecyl benzene sulfonic acid sodium salt supplied in the form of a 60% aqueous solution.

In each of the foregoing Examples II to V the desired complexes can also be prepared according to the procedure of Example I by first complexing iodine with the carrier and then adding the appropriate amount of chlorine as chlorine gas to obtain the iodine chloride complexes.

Compositions obtained in the above examples, when added to an aqueous medium, produce solutions containing any desired concentration of iodine chloride depending upon the amount of the preparation dissolved in the aqueous medium. This solution when applied to control microorganisms gradually releases iodine chloride which decomposes to form free iodine which is effective to combat the microorganisms.

The solutions thus produced may be employed to combat microorganisms domestically and industrially, particularly the latter. For example, such solutions may be applied to paper in the course of its manufacture to control mold and fungi. They may be used for cleaning surfaces to insure sanitary conditions, e. g. for the cleaning of floors, walls, sinks, bowls and other surfaces, as a rinse for dishes and kitchen utensils, as a germicidal composition, and as a constituent of detergent and cleansing compositions.

Various changes and modifications in the foregoing compositions and methods will occur to those skilled in the art, and to the extent that such changes and modifications are embraced by the appended claims, it is to be understood that they constitute part of our invention.

We claim:

1. A preparation for the control of microorganisms consisting essentially of iodine chloride and in major proportion a surface-active compound from the group consisting of aliphatic fatty acid alkylene oxide condensates in which the aliphatic fatty acids contain from 6 to 26 carbon atoms and from 4 to 60 mols of alkylene oxide are condensed per mol of fatty acid, and alkyl aryl sulfonates in which the alkyl group contains from 4 to 30 carbon atoms, and the aryl radical is from the group consisting of phenyl and naphthyl, said preparation containing from 0.1% to 30% iodine and from 0.1% to 10% chlorine.

2. A preparation for the control of microorganisms consisting essentially of iodine chloride and in major proportion an aliphatic fatty acid alkylene oxide condensate, the fatty acid of which contains from 6 to 26 carbon atoms and in which from 4 to 60 mols of alkylene oxide are condensed per mol of fatty acid, said preparation containing from 0.1% to 30% iodine and from 0.1% to 10% chlorine.

3. A preparation for the control of microorganisms consisting essentially of iodine chloride and in major proportion an aliphatic fatty acid ethylene oxide condensate, the fatty acid of which contains from 12 to 18 carbon atoms and in which from 5 to 30 mols of ethylene oxide are condensed per mol of fatty acid, said preparation containing from 0.1% to 30% iodine and from 0.1% to 10% chlorine.

4. A preparation for the control of microorganisms consisting essentially of iodine chloride and in major proportion an alkyl aryl sulfonate, the alkyl group containing from 5 to 20 carbon atoms and the aryl radical being from the group consisting of phenyl and naphthyl, said preparation containing from 0.1% to 30% iodine and from 0.1% to 10% chlorine.

5. The process of producing a preparation for the control of microorganisms, which comprises mixing iodine with a major proportion of compound from the group consisting of aliphatic fatty acid alkylene oxide condensates, the fatty acid of which contains from 6 to 26 carbon atoms and in which from 4 to 60 mols of ethylene oxide are condensed per mol of fatty acid and alkyl aryl sulfonates, the alkyl group of which contains from 4 to 30 carbon atoms and the aryl radical of which is from the group consisting of phenyl and naphthyl, and passing through the resultant mixture chlorine in amount sufficient to form iodine chloride.

6. The process of producing a preparation for the control of microorganisms, which comprises mixing free iodine with a major proportion of an aliphatic fatty acid ethylene oxide condensate, the fatty acid of which contains from 6 to 26 carbon atoms and in which from 4 to 60 mols of ethylene oxide are condensed per mol of fatty acid, and passing through the resultant mixture chlorine in amount sufficient to form iodine chloride and a preparation containing from 0.1% to 30% iodine and from 0.1% to 10% chlorine based on the weight of the aliphatic fatty acid ethylene oxide condensate.

7. The process of producing a preparation for the control of microorganisms, which comprises mixing free iodine with a major proportion of an alkyl aryl sulfonate, the alkyl group of which contains from 1 to 30 carbon atoms and the aryl radical of which is from the group consisting of phenyl and naphthyl, and passing through the resultant mixture chlorine in amount sufficient to form iodine chloride and a preparation containing from 0.1% to 30% iodine and from 0.1% to 10% chlorine based on the weight of the alkyl aryl sulfonate.

No references cited.